(12) United States Patent  (10) Patent No.: US 12,181,751 B2
Liu  (45) Date of Patent: Dec. 31, 2024

(54) DISPLAY PANEL, ARRAY SUBSTRATE, AND MANUFACTURING METHOD THEREOF

(71) Applicant: TCL CHINA STAR OPTOELECTRONICS TECHNOLOGY CO., LTD., Shenzhen (CN)

(72) Inventor: Jing Liu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/771,605

(22) PCT Filed: Apr. 13, 2022

(86) PCT No.: PCT/CN2022/086644
§ 371 (c)(1),
(2) Date: Apr. 25, 2022

(87) PCT Pub. No.: WO2023/178753
PCT Pub. Date: Sep. 28, 2023

(65) Prior Publication Data
US 2024/0264493 A1  Aug. 8, 2024

(30) Foreign Application Priority Data
Mar. 25, 2022 (CN) .......................... 202210307052.8

(51) Int. Cl.
*G02F 1/1343* (2006.01)
(52) U.S. Cl.
CPC .... *G02F 1/134336* (2013.01); *G02F 1/13439* (2013.01); *G02F 2201/121* (2013.01); *G02F 2201/123* (2013.01)

(58) Field of Classification Search
None
See application file for complete search history.

(56) References Cited

U.S. PATENT DOCUMENTS

2007/0284627 A1* 12/2007 Kimura ............. G02F 1/134309
257/257
2017/0115522 A1* 4/2017 Mun ................ G02F 1/136286
2017/0205676 A1* 7/2017 Li ......................... G02F 1/1368

FOREIGN PATENT DOCUMENTS

CN   104965367 A   10/2015
CN   105094437 A   11/2015
(Continued)

OTHER PUBLICATIONS

PCT International Search Report for International Application No. PCT/CN2022/086644, mailed on Nov. 30, 2022, 10pp.
(Continued)

*Primary Examiner* — Ryan Crockett
(74) *Attorney, Agent, or Firm* — The Roy Gross Law Firm, LLC; Roy Gross

(57) ABSTRACT

The present application discloses a display panel, an array substrate, and a manufacturing method thereof. In the display panel of the present application, capacitance of a array substrate is formed between a first common electrode and a pixel electrode, and a second electrode layer is provided with a second common electrode in a same layer as a drain electrode and a source electrode, and the first common electrode is connected to the second common electrode, which can prevent a difference between positive and negative polarities of the first common electrode and the pixel electrode, thereby solving the problem of horizontal crosstalk.

18 Claims, 15 Drawing Sheets

(56) References Cited

FOREIGN PATENT DOCUMENTS

| | | |
|---|---|---|
| CN | 111653197 A | 9/2020 |
| JP | 2008096839 A | 4/2008 |

OTHER PUBLICATIONS

PCT Written Opinion of the International Search Authority for International Application No. PCT/CN2022/086644, mailed on Nov. 30, 2022, 8pp.

* cited by examiner providing a substrate, forming a first electrode layer on the substrate, the first electrode layer comprising a first common electrode; — S10 forming a first insulating layer on the first electrode layer; — S20 forming a semiconductor layer on the first insulating layer; — S30 forming a second electrode layer on the semiconductor layer, wherein the second electrode layer covers the first insulating layer, the second electrode layer comprises a drain electrode, a source electrode, and a second common electrode, and the drain electrode and the source electrode are respectively connected to the semiconductor layer; — S40 forming a first passivation layer on the second electrode layer; and — S50 forming a third electrode layer on the first passivation layer, the third electrode layer comprising a pixel electrode and a first connection electrode; wherein an orthographic projection of the first common electrode on the substrate at least partially overlaps with an orthographic projection of the pixel electrode on the substrate, and the first connection electrode is connected to the second common electrode and the first common electrode through an opening penetrating the first insulating layer and the first passivation layer. — S60

FIG. 3

DISPLAY PANEL, ARRAY SUBSTRATE, AND MANUFACTURING METHOD THEREOF

CROSS REFERENCE TO RELATED APPLICATIONS

This application is a National Phase of PCT Patent Application No. PCT/CN2022/086644 having International filing date of Apr. 13, 2022, which claims the benefit of priority of Chinese Patent Application No. 202210307052.8, filed Mar. 25, 2022, the contents of which are all incorporated herein by reference in their entirety.

BACKGROUND OF INVENTION

Field of Invention

The present application relates to the field of display technology, and in particular, to a display panel, an array substrate, and a manufacturing method thereof.

Description of Prior Art

The existing thin film transistor liquid crystal display panel is usually composed of a color filter substrate, a thin film transistor array substrate, and a liquid crystal layer disposed between the two substrates, wherein the working principle of the existing thin film transistor liquid crystal display panel is to control the rotation of liquid crystal molecules of the liquid crystal layer by applying a driving voltage, to refract the light from the backlight module to produce a picture. Thin film transistor liquid crystal display panels have a wide range of applications due to their advantages of lightness, environmental protection, and high performance. In recent years, in order to simplify the manufacturing process of thin film transistor liquid crystal display panels and reduce costs, applications of 4-mask process technology have become more and more common. However, the 4-mask process technology combines the photolithography of the semiconductor layer and the second metal layer, so that there is a semiconductor layer under the second metal layer, and the semiconductor layer between the first metal layer and the second metal layer may result in a difference between the positive and negative polarities of the first capacitor electrode plate located on the first metal layer and the second capacitor electrode plate located above the second metal layer, thereby causing a problem of horizontal crosstalk.

SUMMARY OF INVENTION

The present application provides a display panel, an array substrate, and a manufacturing method thereof to solve the problem of horizontal crosstalk.

The present application provides an array substrate, which includes:
 a substrate;
 a first electrode layer disposed on the substrate, and the first electrode layer including a first common electrode;
 a first insulating layer disposed on the first electrode layer;
 a semiconductor layer disposed on the first insulating layer;
 a second electrode layer disposed on the semiconductor layer and covering the first insulating layer, wherein the second electrode layer includes a drain electrode, a source electrode, and a second common electrode, and the drain electrode and the source electrode are respectively connected to the semiconductor layer;
 a first passivation layer disposed on the second electrode layer; and
 a third electrode layer disposed on the first passivation layer, and the third electrode layer including a pixel electrode;
 wherein an orthographic projection of the first common electrode on the substrate at least partially overlaps with an orthographic projection of the pixel electrode on the substrate, and the second common electrode is connected to the first common electrode through an opening in the first insulating layer.

Optionally, in some embodiments of the present application, the third electrode layer further includes a first connection electrode, and the first connection electrode is connected to the second common electrode and the first common electrode through an opening penetrating the first insulating layer and the first passivation layer.

Optionally, in some embodiments of the present application, the orthographic projection of the first common electrode on the substrate at least partially overlaps with an orthographic projection of the second common electrode on the substrate.

Optionally, in some embodiments of the present application, the orthographic projection of the first common electrode on the substrate, the orthographic projection of the pixel electrode on the substrate, and an orthographic projection of the second common electrode on the substrate at least partially overlap.

Optionally, in some embodiments of the present application, the second electrode layer further includes a second connection electrode, a plurality of first common electrodes are arranged in an array, a plurality of second common electrodes are arranged in an array, and the second connection electrode is connected to the second common electrodes in a same row.

Optionally, in some embodiments of the present application, the first electrode layer further includes a third connection electrode, and the third connection electrode is connected to the first common electrodes in a same column.

Optionally, in some embodiments of the present application, the substrate includes a transparent area and an opaque area, the transparent area includes a first trunk electrode area, a second trunk electrode area, and a branch electrode area, and the second connection electrode is disposed in the opaque area and the first trunk electrode area.

Optionally, in some embodiments of the present application, the first electrode layer further includes a third common electrode, the second electrode layer further includes a fourth common electrode, the third common electrode and the fourth common electrodes are disposed in the first trunk electrode area, and an orthographic projection of the third common electrode on the substrate overlaps with an orthographic projection of the fourth common electrode on the substrate.

Optionally, in some embodiments of the present application, the first electrode layer further includes a fifth common electrode and a fifth connection electrode, the second electrode layer further includes a sixth common electrode and a sixth connection electrode, and the fifth common electrode and the sixth common electrode are disposed in the second trunk electrode area; and
 an orthographic projection of the fifth common electrode on the substrate overlaps with an orthographic projection of the sixth common electrode on the substrate.

Optionally, in some embodiments of the present application, the first electrode layer further includes a fifth common electrode and a fifth connection electrode, the second electrode layer further includes a sixth common electrode and a sixth connection electrode, and the fifth common electrode and the sixth common electrode are disposed in the second trunk electrode area; and wherein the fifth common electrode is connected to the third common electrode, the sixth common electrode is connected to the fourth common electrode, and an orthographic projection of the fifth common electrode on the substrate overlaps with an orthographic projection of the sixth common electrode on the substrate.

Correspondingly, the present application also provides a method of manufacturing an array substrate, which includes:

providing a substrate, forming a first electrode layer on the substrate, the first electrode layer including a first common electrode;

forming a first insulating layer on the first electrode layer;

forming a semiconductor layer on the first insulating layer;

forming a second electrode layer on the semiconductor layer, wherein the second electrode layer covers the first insulating layer, the second electrode layer includes a drain electrode, a source electrode, and a second common electrode, and the drain electrode and the source electrode are respectively connected to the semiconductor layer;

forming a first passivation layer on the second electrode layer; and forming a third electrode layer on the first passivation layer, the third electrode layer including a pixel electrode and a first connection electrode;

wherein an orthographic projection of the first common electrode on the substrate at least partially overlaps with an orthographic projection of the pixel electrode on the substrate, and the first connection electrode is connected to the second common electrode and the first common electrode through an opening penetrating the first insulating layer and the first passivation layer.

Correspondingly, the present application further provides a display panel, which includes an array substrate, a color filter substrate disposed opposite to the array substrate, and a liquid crystal layer disposed between the array substrate and the color filter substrate;

wherein the array substrate includes:
a substrate;
a first electrode layer disposed on the substrate, and the first electrode layer including a first common electrode;
a first insulating layer disposed on the first electrode layer;
a semiconductor layer disposed on the first insulating layer;
a second electrode layer disposed on the semiconductor layer and covering the first insulating layer, wherein the second electrode layer includes a drain electrode, a source electrode, and a second common electrode, and the drain electrode and the source electrode are respectively connected to the semiconductor layer;
a first passivation layer disposed on the second electrode layer; and
a third electrode layer disposed on the first passivation layer, and the third electrode layer including a pixel electrode;
wherein an orthographic projection of the first common electrode on the substrate at least partially overlaps with an orthographic projection of the pixel electrode on the substrate, and the second common electrode is connected to the first common electrode through an opening in the first insulating layer.

Optionally, in some embodiments of the present application, the third electrode layer further includes a first connection electrode, and the first connection electrode is connected to the second common electrode and the first common electrode through an opening penetrating the first insulating layer and the first passivation layer.

Optionally, in some embodiments of the present application, the orthographic projection of the first common electrode on the substrate at least partially overlaps with an orthographic projection of the second common electrode on the substrate.

Optionally, in some embodiments of the present application, the orthographic projection of the first common electrode on the substrate, the orthographic projection of the pixel electrode on the substrate, and an orthographic projection of the second common electrode on the substrate at least partially overlap.

Optionally, in some embodiments of the present application, the second electrode layer further includes a second connection electrode, a plurality of first common electrodes are arranged in an array, a plurality of second common electrodes are arranged in an array, and the second connection electrode is connected to the second common electrodes in a same row.

Optionally, in some embodiments of the present application, the first electrode layer further includes a third connection electrode, and the third connection electrode is connected to the first common electrodes in a same column.

Optionally, in some embodiments of the present application, the substrate includes a transparent area and an opaque area, the transparent area includes a first trunk electrode area, a second trunk electrode area, and a branch electrode area, and the second connection electrode is disposed in the opaque area and on the first trunk electrode area.

Optionally, in some embodiments of the present application, the first electrode layer further includes a third common electrode, the second electrode layer further includes a fourth common electrode, the third common electrode and the fourth common electrodes are disposed in the first trunk electrode area, and an orthographic projection of the third common electrode on the substrate overlaps with an orthographic projection of the fourth common electrode on the substrate.

Optionally, in some embodiments of the present application, the first electrode layer further includes a fifth common electrode and a fifth connection electrode, the second electrode layer further includes a sixth common electrode and a sixth connection electrode, and the fifth common electrode and the sixth common electrode are disposed in the second trunk electrode area; and wherein an orthographic projection of the fifth common electrode on the substrate overlaps with an orthographic projection of the sixth common electrode on the substrate.

The present application provides a display panel, an array substrate, and a manufacturing method thereof, wherein the array substrate includes a substrate; a first electrode layer disposed on the substrate, and the first electrode layer including a first common electrode; a first insulating layer disposed on the first electrode layer; a semiconductor layer disposed on the first insulating layer; a second electrode layer disposed on the semiconductor layer and covering the first insulating layer, wherein the second electrode layer includes a drain electrode, a source electrode, and a second common electrode, and the drain electrode and the source electrode are respectively connected to the semiconductor layer; a first passivation layer disposed on the second electrode layer; and a third electrode layer disposed on the first passivation layer, and the third electrode layer including a pixel electrode; wherein an orthographic projection of the first common electrode on the substrate at least partially overlaps with an orthographic projection of the pixel electrode on the substrate, and the second common electrode is connected to the first common electrode through an opening in the first insulating layer. In the present application, the capacitance of the array substrate is formed between the first common electrode and the pixel electrode, the second electrode layer is provided with a second common electrode located in the same layer as the drain electrode and the source electrode, and the first common electrode is connected to the second common electrode, to prevent a difference between the positive and negative polarities of the first common electrode on the first electrode layer and the pixel electrode on the third electrode layer due to existence of the semiconductor layer, thereby solving the problem of horizontal crosstalk.

BRIEF DESCRIPTION OF DRAWINGS

FIG. 3 is a flowchart of a method of manufacturing an array substrate provided by the present application.

DETAILED DESCRIPTION OF PREFERRED EMBODIMENTS

Figure 1:
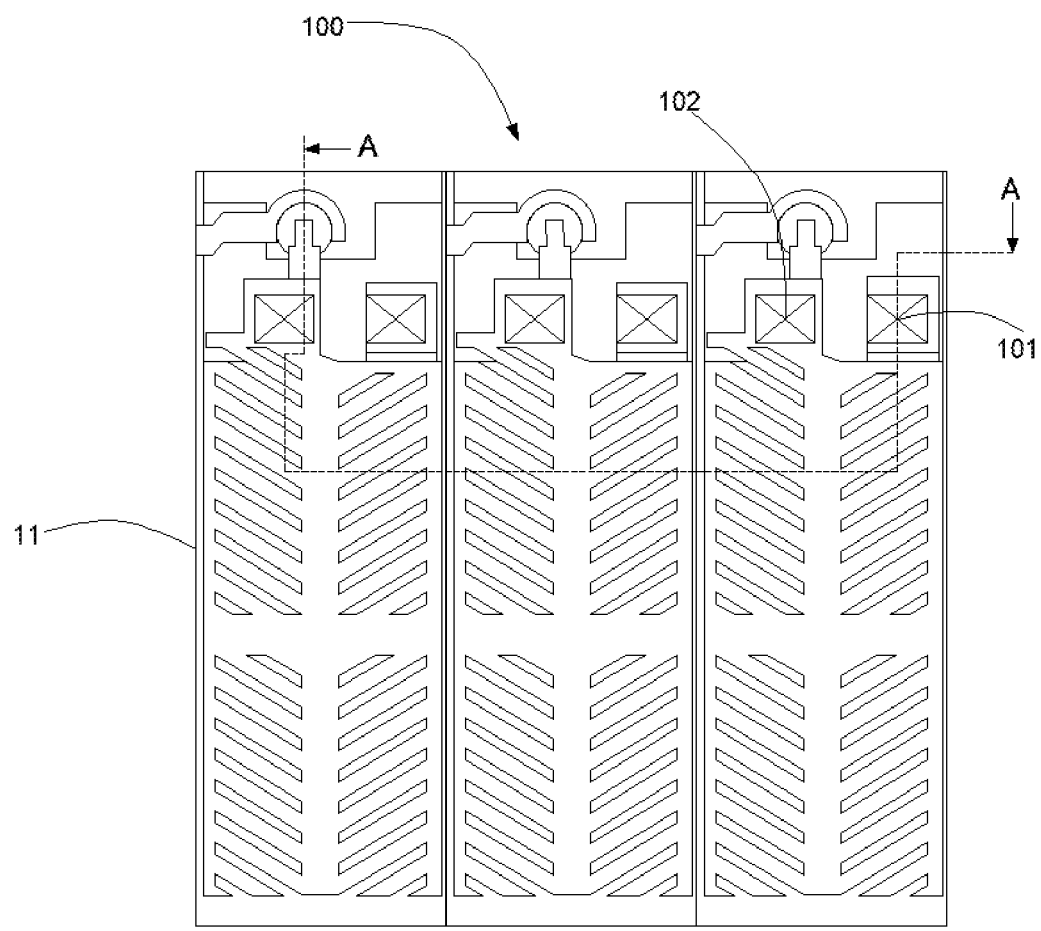
FIG. 1 is a schematic diagram of a first structure of an array substrate provided by the present application.

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

In the description of this application, it should be understood that the terms "center", "longitudinal", "transverse", "length", "width", "thickness", "upper", "lower", "front", "Rear", "left", "right", "vertical", "horizontal", "top", "bottom", "inside", "outside", "clockwise", "counterclockwise", and the like are based on the orientation or positional relationship shown in the drawings, and is merely for the convenience of describing the present invention and simplifying the description, rather than indicating or implying that the device or element referred to must have a specific orientation, structure and operation in a specific orientation, which should not be construed as limitations on the present invention. In addition, the terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "a plurality" is two or more, unless specifically defined otherwise.

The present application provides a display panel, an array substrate, and a manufacturing method thereof, which will be described in detail below. It should be noted that the order of description in the following embodiments is not intended to limit the preferred order of the embodiments.

Figure 2:
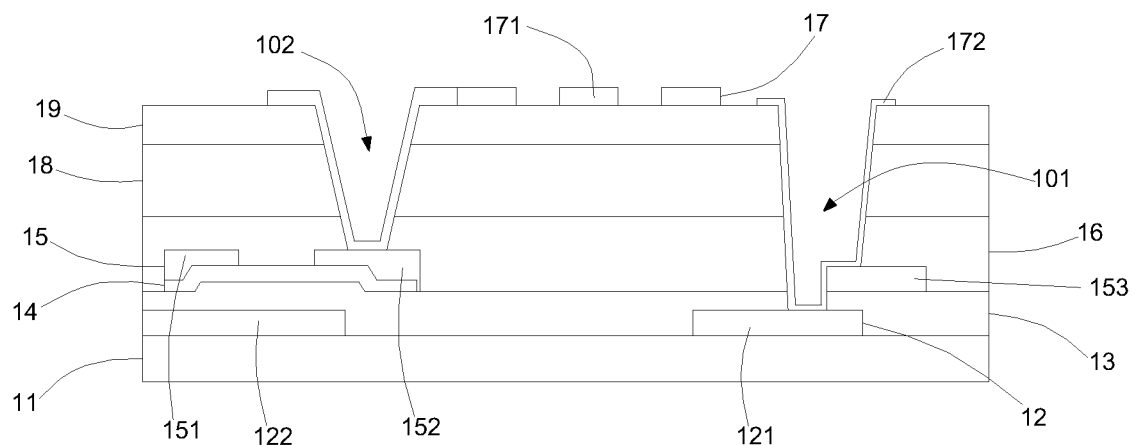
FIG. 2 is a cross-sectional view taken along the line A-A in FIG. 1.

Referring to FIGS. 1 and 2, FIG. 1 is a schematic diagram of a first structure of an array substrate 100 provided by the present application, and FIG. 2 is a cross-sectional view taken along line A-A in FIG. 1. The present application provides an array substrate 100, which includes a substrate 11, a first electrode layer 12, a first insulating layer 13, a semiconductor layer 14, a second electrode layer 15, a first passivation layer 16, and a third electrode layer 17.

A material of the substrate 11 can be selected according to needs, such as a rigid material or a flexible material. The substrate 11 can be configured as a rigid substrate or a flexible substrate as required. If the substrate 11 is a flexible substrate, the flexible substrate includes a single-layered flexible organic layer or two or more flexible organic layers. The material of the flexible organic layer is selected from the group consisting of polyimide, polyethylene naphthalate, polyethylene terephthalate, polyarylate, polycarbonate, polyetherimide, and polyethersulfone.

The materials of the first electrode layer 12, the second electrode layer 15, and the third electrode layer 17 may be an alloy containing one or more of copper, molybdenum, molybdenum titanium, aluminum, titanium, and nickel. The material of the semiconductor layer 14 may be an amorphous silicon semiconductor material or a metal oxide semiconductor material. In this embodiment, the material of the semiconductor layer 14 is a metal oxide semiconductor material, and the metal oxide semiconductor material may be any one of indium gallium tin oxide semiconductor material, indium gallium zinc tin oxide semiconductor material, and indium gallium zinc oxide semiconductor material.

The first electrode layer 12 is disposed on the substrate 11, and the first electrode layer 12 includes a first common electrode 121; the first insulating layer 13 is disposed on the first electrode layer 12; the semiconductor layer 14 is disposed on the first insulating layer 13; the second electrode layer 15 is disposed on the semiconductor layer 14 and covers the first insulating layer 13, and the second electrode layer 15 includes a drain electrode 152, a source electrode 151, and the second common electrode 153. The drain electrode 152 and the source electrode 151 are respectively connected to the semiconductor layer 14; the first passivation layer 16 is disposed on the second electrode layer 15; the third electrode layer 17 is disposed on the first passivation layer 16, and the third electrode layer 17 includes a pixel electrode 171.

An orthographic projection of the first common electrode 121 on the substrate 11 at least partially overlaps with an orthographic projection of the pixel electrode 171 on the substrate 11, and the second common electrode 153 is connected to the first common electrode 121 through an opening 101 on the first insulation layer 13.

Since the orthographic projection of the first common electrode 121 on the substrate 11 at least partially overlaps with the orthographic projection of the pixel electrode 171 on the substrate 11, in the present application, a storage capacitor of the array substrate 100 is formed between the first common electrode 121 and the pixel electrode 171. In addition, since the first common electrode 121 is located below the semiconductor layer 14 and the pixel electrode 171 is located above the semiconductor layer 14, the semiconductor layer 14 may cause a difference between the positive and negative polarities of the first common electrode 121 and the pixel electrode 171. Therefore, in the present application, the second electrode layer 15 is also provided with a second common electrode 153 located in the same layer as the drain electrode 152 and the source electrode 151, and the first common electrode 121 is connected to the second common electrode 153, to prevent a difference between the positive and negative polarities of the first common electrode 121 on the first electrode layer 12 and the pixel electrode 171 on the third electrode layer 17 due to existence of the semiconductor layer 14, thereby solving the problem of horizontal crosstalk.

Further, in some embodiments, the first electrode layer 12 further includes a gate electrode 122, the orthographic projection of the gate electrode 122 on the substrate 11 overlaps with the orthographic projection of the semiconductor layer 14 on the substrate 11. In the present application, the gate electrode 122 and the first common electrode 121 are disposed on the same electrode layer, which can reduce a number of electrode layers.

In addition, the pixel electrode 171 is connected to one of the source electrode 151 and the drain electrode 152. Specifically, the pixel electrode 171 is connected to the drain electrode 152 through the opening 102 on the first passivation layer 16.

In some embodiments, the third electrode layer 17 further includes a first connection electrode 172, and the first connection electrode 172 is sequentially connected to the second common electrode 153 and the first common electrode 121 through the opening 101 on the first insulating layer 13 and the first passivation layer 16.

In the present application, the first insulating layer 13 and the first passivation layer 16 are provided with the opening, and then the first connection electrode 172 is sequentially connected to the second common electrode 153 and the first common electrode 12, so as to realize the connection between the first common electrode 121 and the second common electrode 153. Both the first connection electrode 172 and the pixel electrode 171 are located in the third electrode layer 17, so the arrangement of electrode layers can be reduced, and the processing time can be reduced at the same time.

Further, in some embodiments, the orthographic projection of the first common electrode 121 on the substrate 11 at least partially overlaps with the orthographic projection of the second common electrode 153 on the substrate 11. By at least partially overlapping the first common electrode 121 with the second common electrode 153, the occupied space is as small as possible, and the aperture ratio of the substrate 11 can be improved. Still further, the orthographic projection of the first common electrode 121 on the substrate 11 covers the orthographic projection of the second common electrode 153 on the substrate 11.

In addition, further, the array substrate 100 further includes a color filter layer 18 and a second passivation layer 19. The color filter layer 18 is disposed on the first passivation layer 16, the second passivation layer 19 is disposed on the color filter layer 18, and the third electrode layer 17 is disposed on the second passivation layer 19. The first connection electrode 172 is connected to the common electrode 153 and the first common electrode 121 sequentially through the opening 101 on the first insulating layer 13, the first passivation layer 16, the color filter layer 18, and the second passivation layer 19. The pixel electrode 171 is connected to the drain electrode 152 through the opening 102 on first passivation layer 16, the color filter layer 18, and the second passivation layer 19.

Referring to FIG. 3, FIG. 3 is a flowchart of a method of manufacturing the array substrate 100 provided by the present application. Correspondingly, the present application also provides a method of manufacturing the array substrate 100, which includes:

S10, providing a substrate 11, forming a first electrode layer 12 on the substrate 11, the first electrode layer 12 including a first common electrode 121;

S20, forming a first insulating layer 13 on the first electrode layer 12;

S30, forming a semiconductor layer 14 on the first insulating layer 13;

S40, forming a second electrode layer 15 on the semiconductor layer 14, wherein the second electrode layer 15 covers the first insulating layer 13, the second electrode layer 15 includes a drain electrode 152, a source electrode 151, and a second common electrode 153, and the drain electrode 152 and the source electrode 151 are respectively connected to the semiconductor layer 14;

S50, forming a first passivation layer 16 on the second electrode layer 15; and

S60, forming a third electrode layer 17 on the first passivation layer 16, the third electrode layer 17 including a pixel electrode 171 and a first connection electrode 172;

An orthographic projection of the first common electrode 121 on the substrate 11 at least partially overlaps with an orthographic projection of the pixel electrode 171 on the substrate 11, and the second common electrode 153 is connected to the first common electrode 121 through an opening in the first insulating layer 13.

Correspondingly, the present application further provides a display panel, which includes the above-mentioned array substrate 100, and further includes a color filter substrate disposed opposite to the array substrate 100, and a liquid crystal layer located between the array substrate 100 and the color filter substrate.

Compared with the prior art, beneficial effects of the display panel provided by embodiments of the present application are the same as beneficial effects of the array substrate 100 provided by the above-mentioned technical solutions, which will not be repeated herein for brevity.

Figure 4:
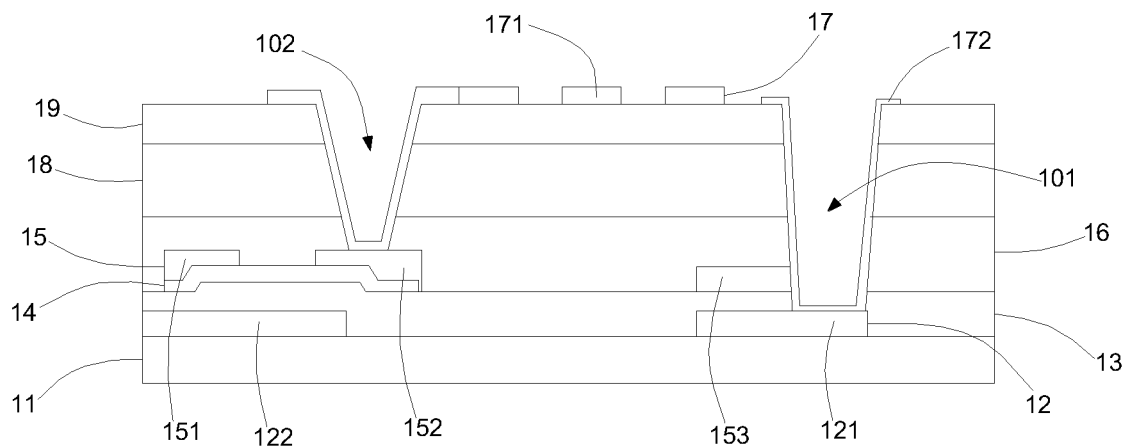
FIG. 4 is a schematic diagram of a second structure of the array substrate provided by the present application.

Referring to FIG. 4, FIG. 4 is a schematic diagram of the second structure of the array substrate 100 provided by the present application. The difference between the array substrate 100 provided in this embodiment and the array substrate 100 provided in FIG. 1 is that the orthographic projection of the first common electrode 121 on the substrate 11, the orthographic projection of the pixel electrode 171 on the substrate 11, and the orthographic projection of the second common electrode 153 on the substrate 11 at least partially overlap.

That is, the orthographic projection of the first common electrode 121 on the substrate 11, the orthographic projection of the pixel electrode 171 on the substrate 11, and the orthographic projection of the second common electrode 153 on the substrate 11 have an overlapping portion, which can minimize the space occupied by the first common electrode 121 and the second common electrode 153 and improve the aperture ratio of the substrate 11.

Figure 5:
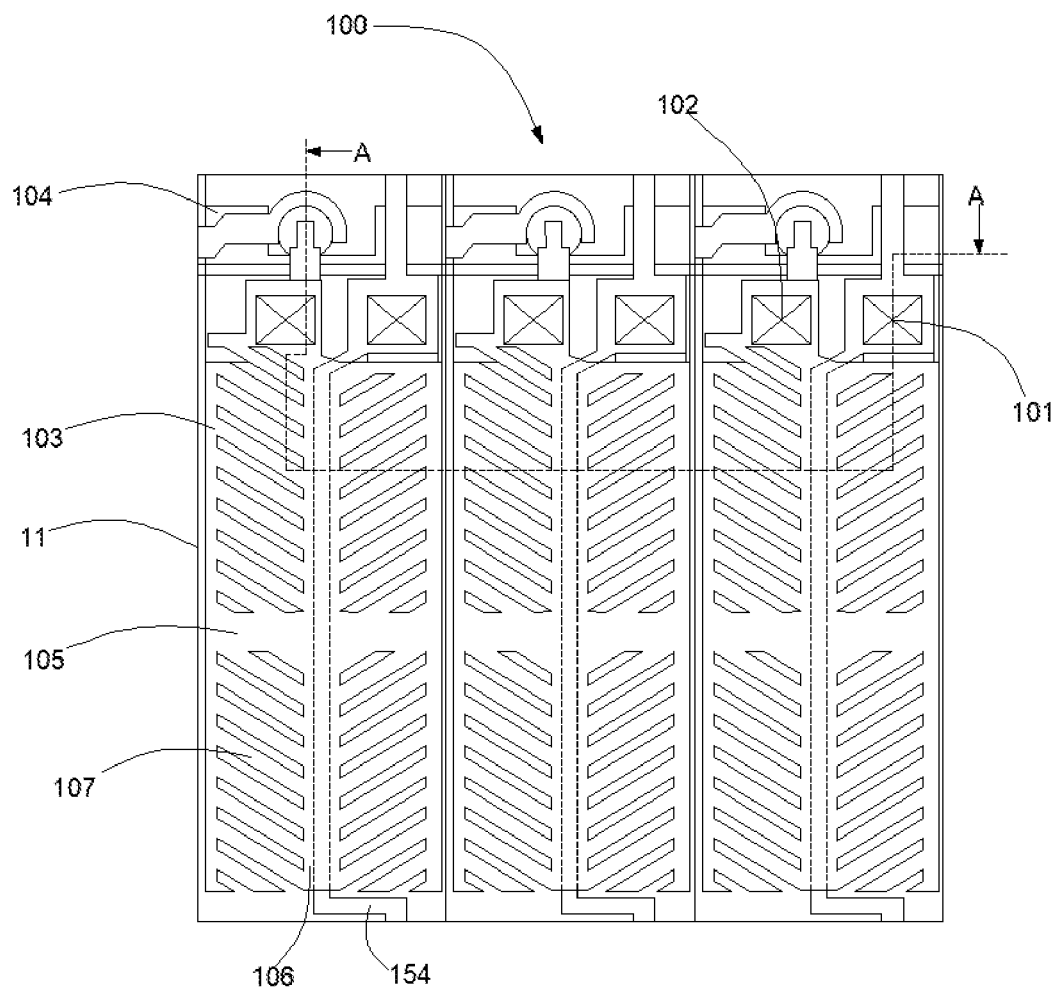
FIG. 5 is a schematic diagram of a third structure of the array substrate provided by the present application.
Figure 6:
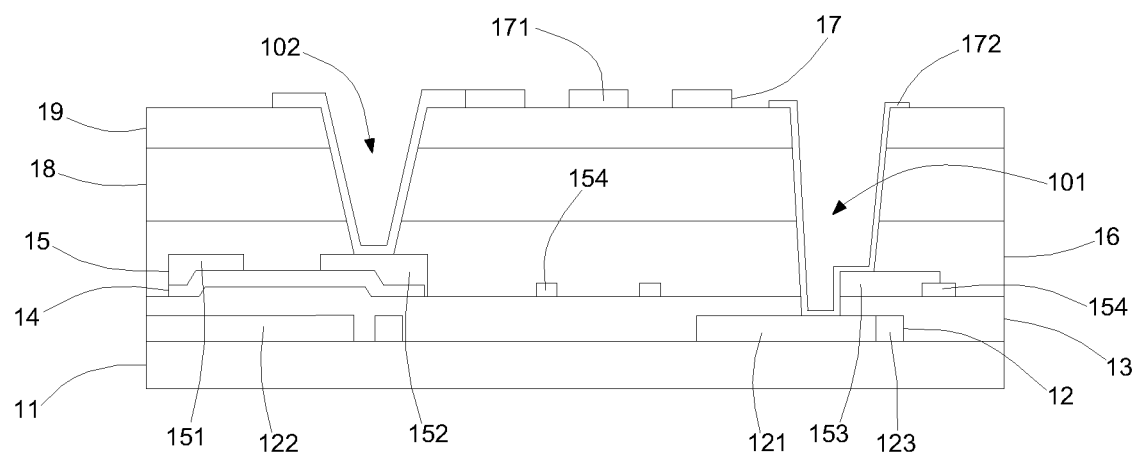
FIG. 6 is a cross-sectional view taken along the line A-A in FIG. 5.
Figure 7:
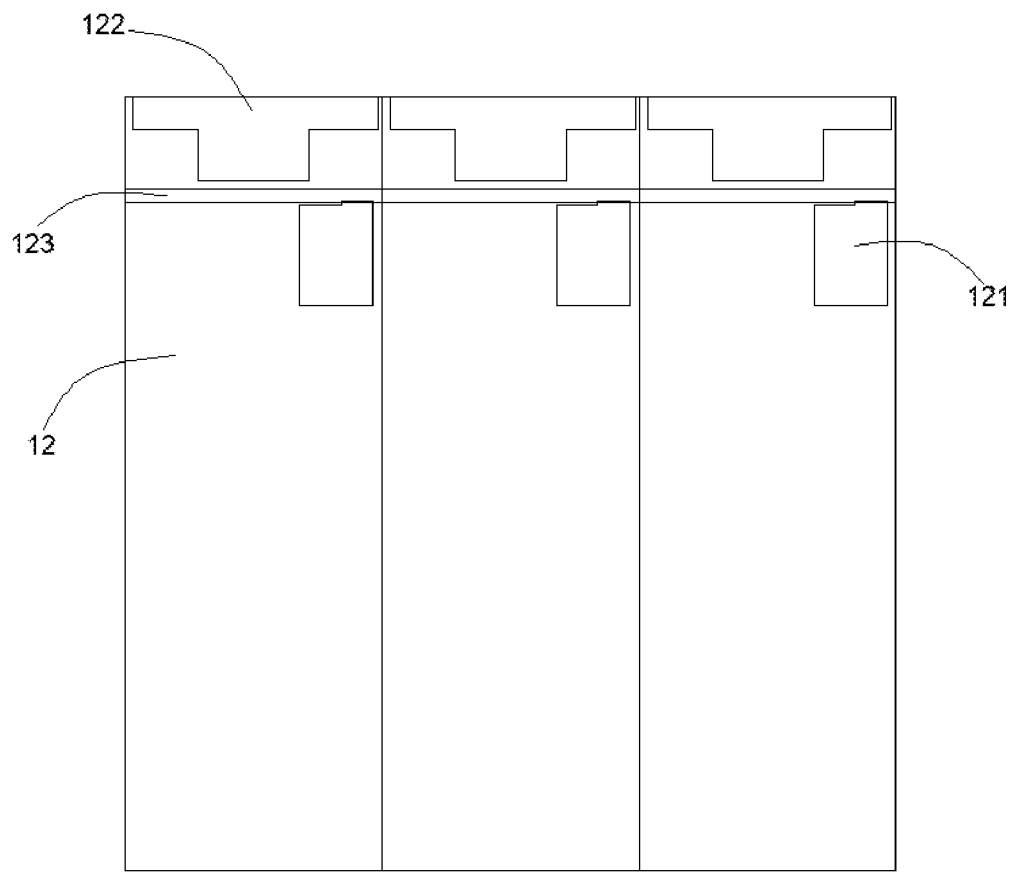
FIG. 7 is a top view of the first electrode layer in FIG. 5.
Figure 8:
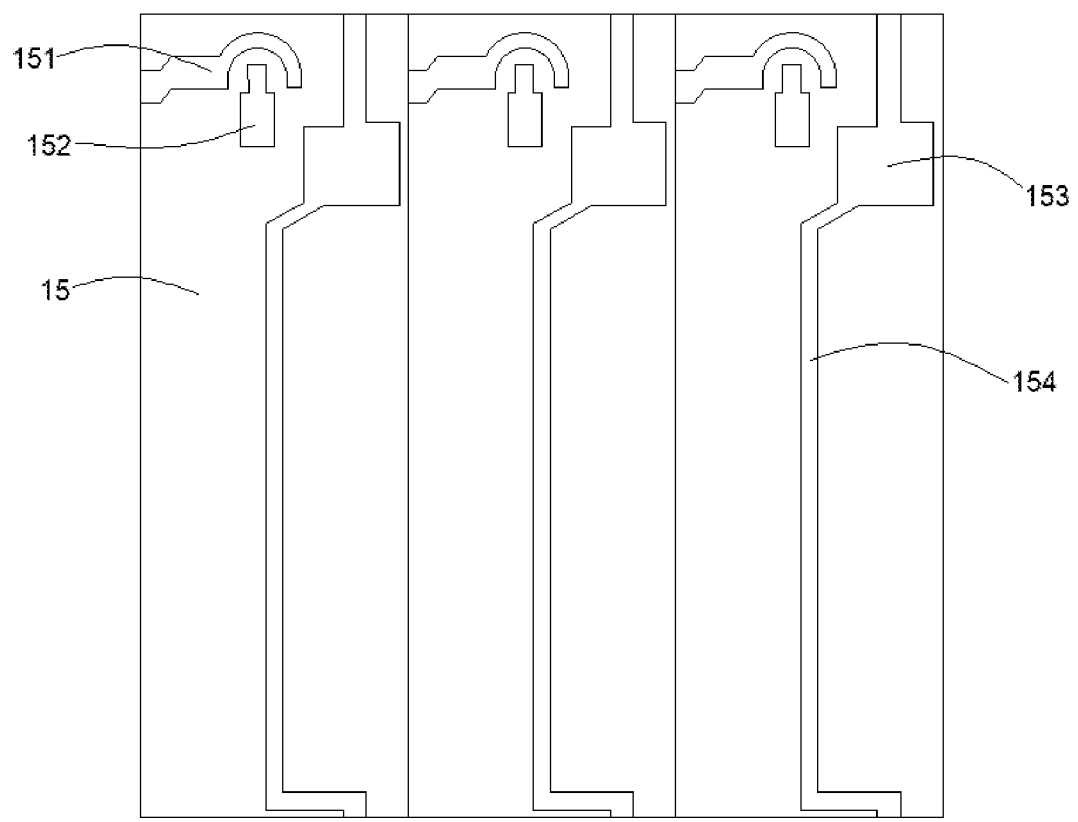
FIG. 8 is a top view of the second electrode layer in FIG. 5.

Referring to FIGS. 5 to 8, FIG. 5 is a schematic diagram of the third structure of the array substrate 100 provided by the present application, FIG. 6 is a cross-sectional view taken along line A-A in FIG. 5, FIG. 7 is a top view of the first electrode layer in FIG. 5, and FIG. 8 is a top view of the second electrode layer in FIG. 5. The difference from the array substrate 100 provided in FIG. 1 is that, in this embodiment, the second electrode layer 15 further includes a second connection electrode 154, a plurality of first common electrodes 121 are arranged in an array, a plurality of second common electrodes 153 are arranged in an array, and the second connection electrode 154 is connected to the second common electrodes 153 in the same row.

In the present application, the second common electrodes 153 in the same row are connected to each other through the second connection electrode 154, so that the first common electrodes 121 in the same row are connected to each other, thereby improving the potential recovery speed of the first common electrodes 121, to further alleviate the problem of horizontal crosstalk.

Still further, in some embodiments, the substrate 11 includes a transparent area 103 and an opaque area 104, and the transparent area 103 includes a first trunk electrode area 106, a second trunk electrode area 105, and a branch electrode area 107. The pixel electrode 171 is located in the transparent area 103, and the second connection electrode 154 is disposed in the opaque area 104 and on the first trunk electrode area 106.

In the present application, the second connection electrode 154 is arranged in the first trunk electrode area 106, which can prevent the second connection electrode 154 from occupying a design space of the substrate 11, thereby increasing the aperture ratio of the substrate 11.

In some embodiments, the first electrode layer 12 further includes a third connection electrode 123, and the third connection electrode 123 is connected to the first common electrodes 121 in the same column.

That is, in the present application, on the basis of connecting the first common electrodes 121 located in the same row, the first common electrodes 121 located in the same column are connected to each other through the third connection electrode 123, so that the first common electrodes 121 located in the rows and columns are connected to form a grid electrode, thereby further improving the potential recovery speed of the first common electrode 121 and alleviating the problem of horizontal crosstalk.

Figure 9:
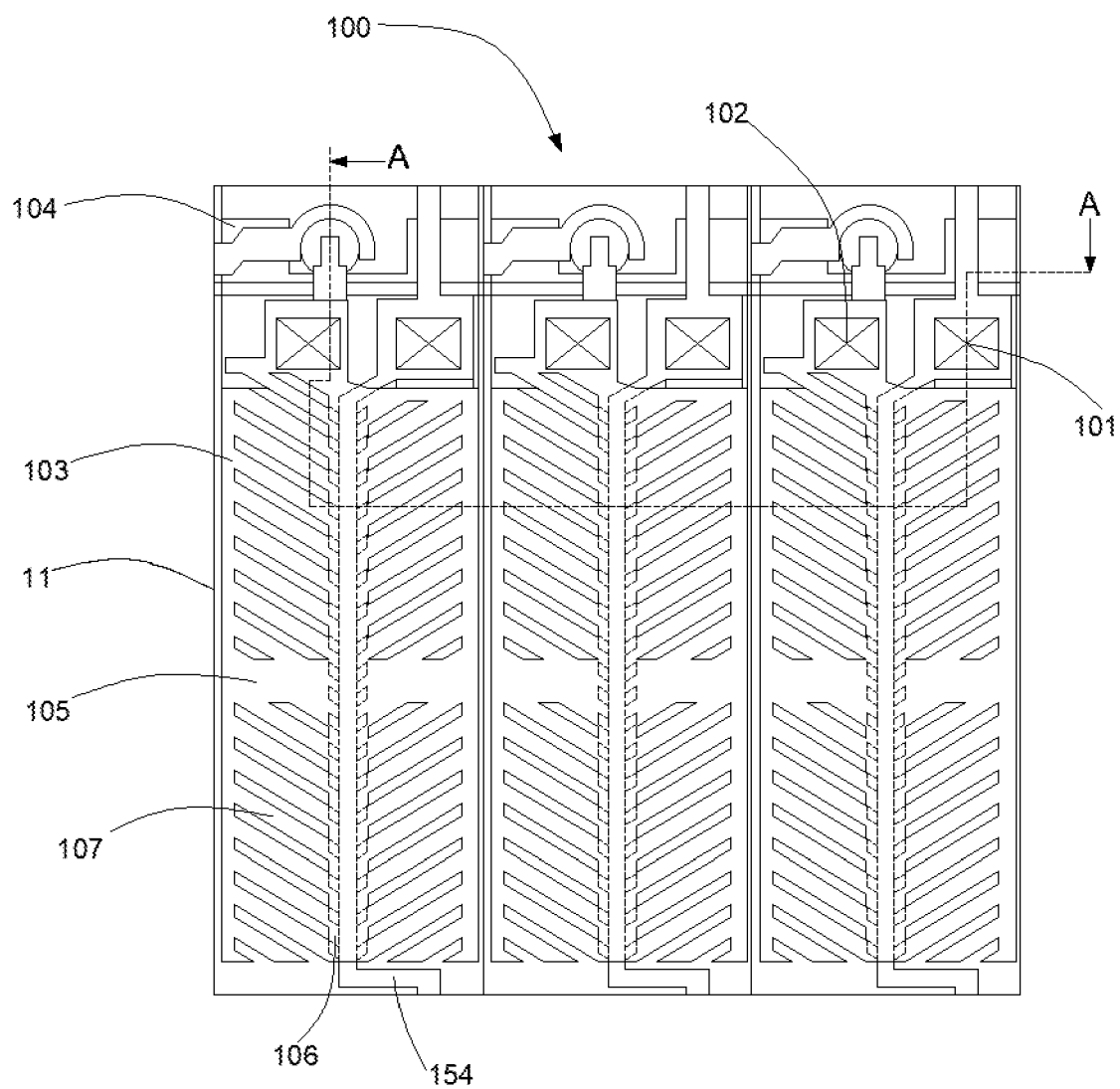
FIG. 9 is a schematic diagram of a fourth structure of the array substrate provided by the present application.
Figure 10:
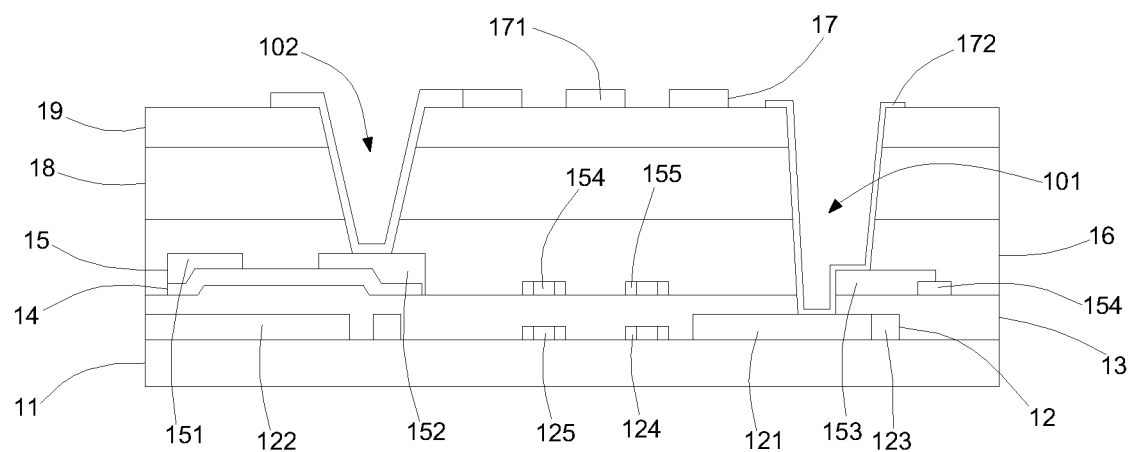
FIG. 10 is a cross-sectional view taken along the line A-A in FIG. 9.
Figure 11:
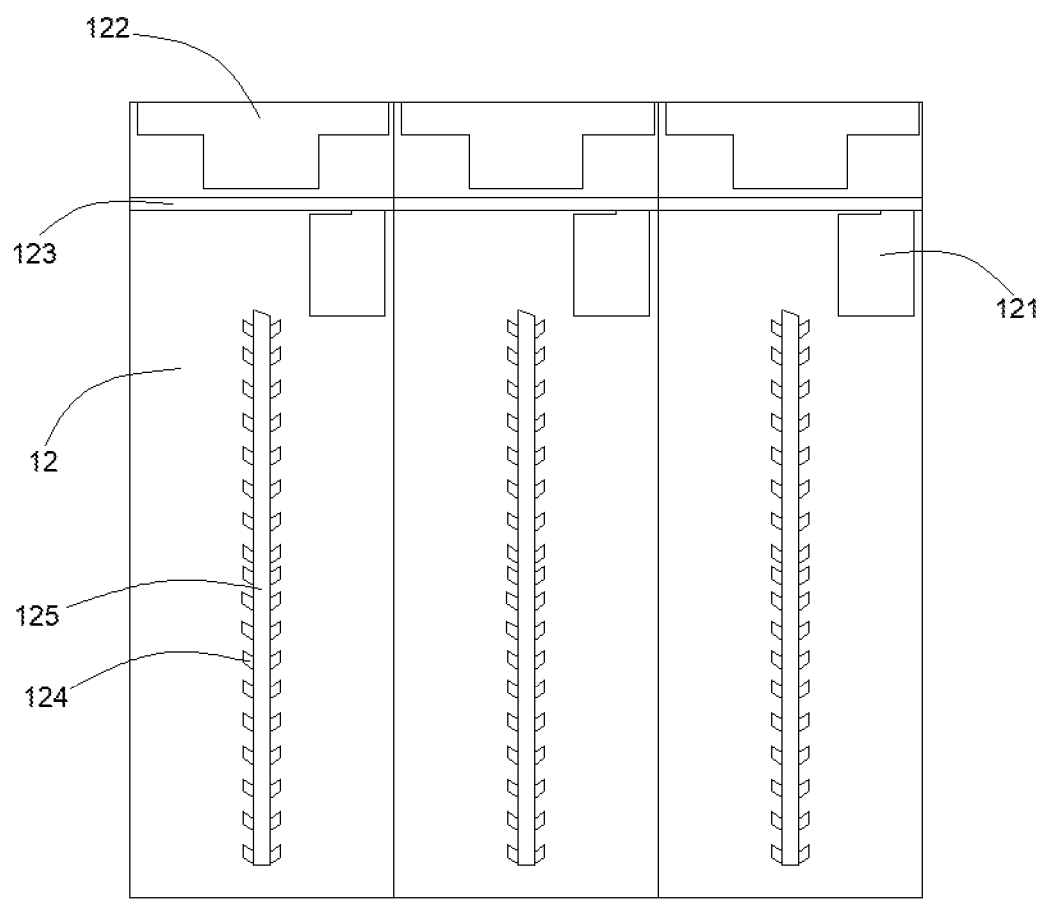
FIG. 11 is a top view of the first electrode layer in FIG. 9.
Figure 12:
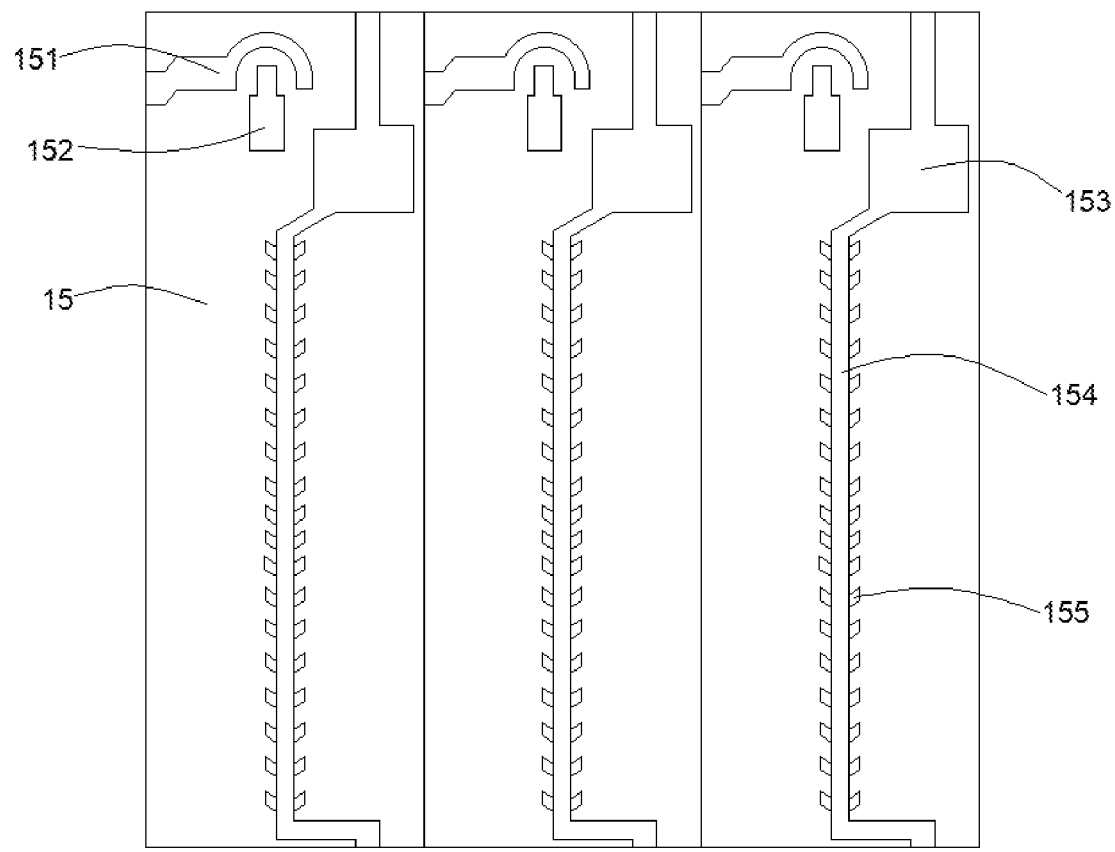
FIG. 12 is a top view of the second electrode layer in FIG. 9.

Referring to FIGS. 9 to 12, FIG. 9 is a schematic diagram of a fourth structure of the array substrate 100 provided by the present application, FIG. 10 is a cross-sectional view taken along line A-A in FIG. 9, FIG. 11 is a top view of the first electrode layer in FIG. 9, and FIG. 12 is a top view of the second electrode layer in FIG. 9. The difference between the array substrate 100 provided in this embodiment and the array substrate 100 provided in FIG. 5 is that the first electrode layer 12 further includes a third common electrode 124, and the second electrode layer 15 further includes a fourth common electrodes 155, the third common electrode 124 and the fourth common electrode 155 are provided in the first trunk electrode area 106, and the orthographic projection of the third common electrode 124 on the substrate 11 overlaps with the orthographic projection of the fourth common electrode 155 on the substrate 11.

Since the existence of the semiconductor layer 14 will affect the value of the storage capacitance, the variable refresh rate of the display panel is thus ineffective. Therefore, in the present application, a third common electrode 124 is provided in the first trunk electrode area 106 through the first electrode layer 12, and a fourth common electrode 155 is provided in the first trunk electrode area 106 through the second electrode layer 15, so that the orthographic projection of the third common electrode 124 on the substrate 11 overlaps with the orthographic projection of the fourth common electrode 155 on the substrate 11, thus forming a storage capacitor between the third common electrode 124 and the fourth common electrode 155, thereby increasing the capacity of the storage capacitor, thereby improving the effect of the variable refresh rate of the display panel.

Further, in some embodiments, the first electrode layer 12 further includes a fourth connection electrode 125, the number of the third common electrode 124 and the number of the fourth common electrode 155 are plural, and the fourth connection electrode 125 connect the plurality of third common electrodes, and the second connection electrodes 154 connect the plurality of fourth common electrodes 155. The plurality of third common electrodes 124 are arranged in an array, and the plurality of fourth common electrodes 155 are arranged in an array.

Figure 13:
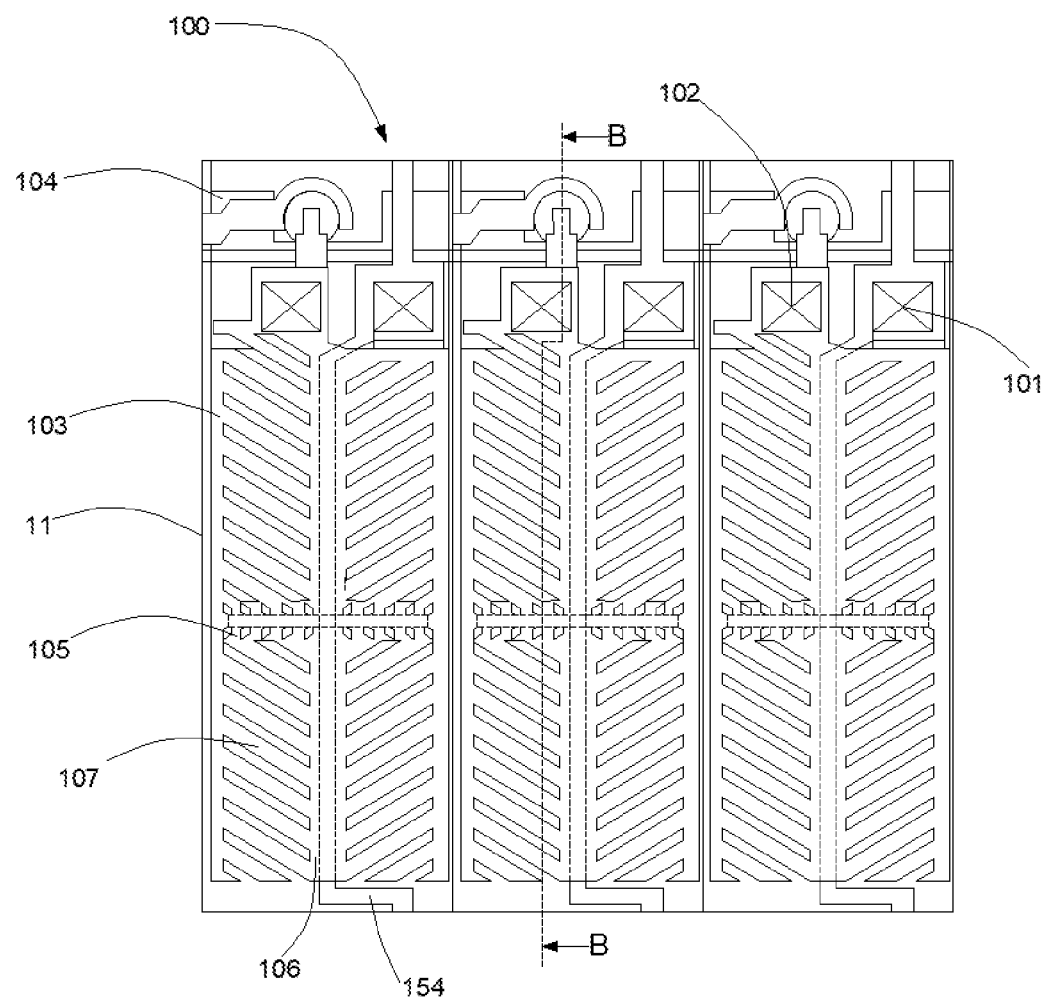
FIG. 13 is a schematic diagram of a fifth structure of the array substrate provided by the present application.
Figure 14:
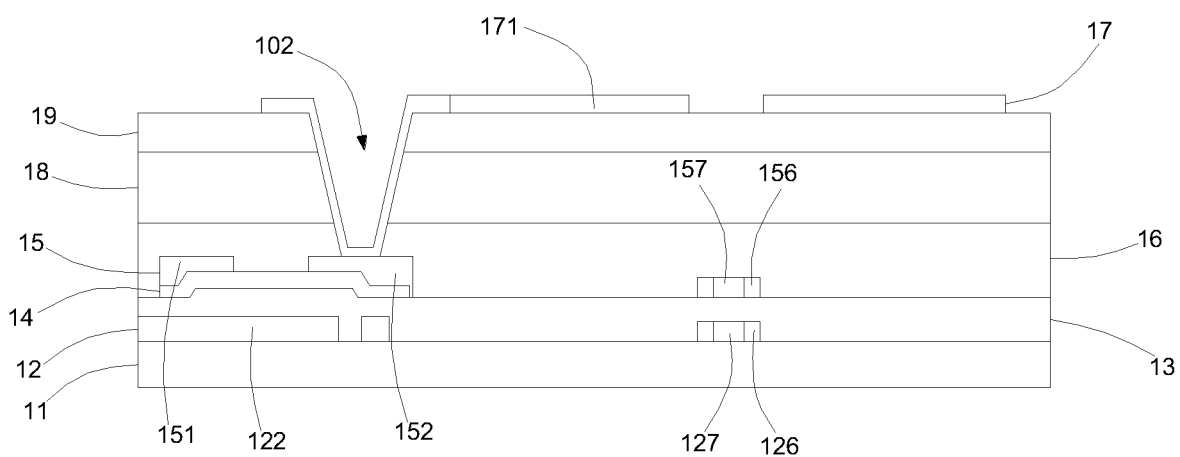
FIG. 14 is a cross-sectional view taken along the line B-B in FIG. 13.
Figure 15:
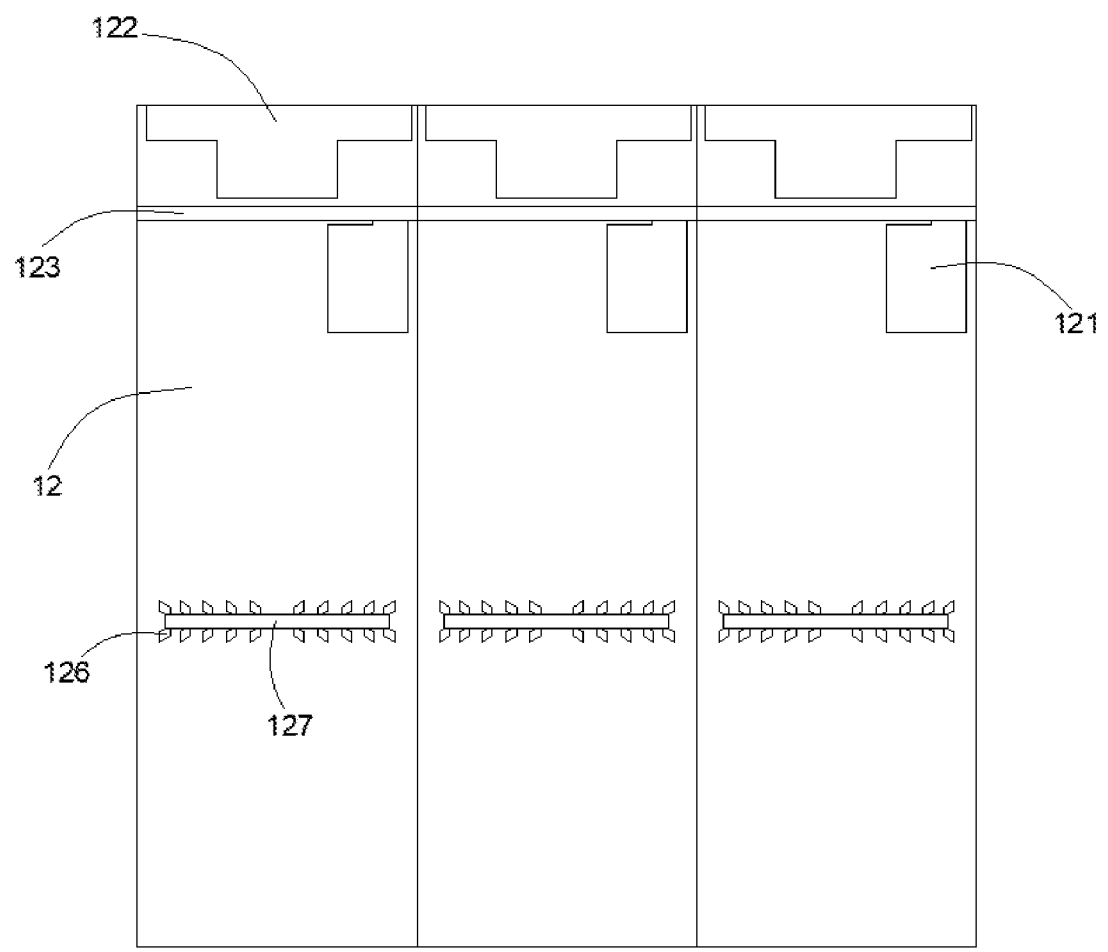
FIG. 15 is a top view of the first electrode layer in FIG. 13.
Figure 16:
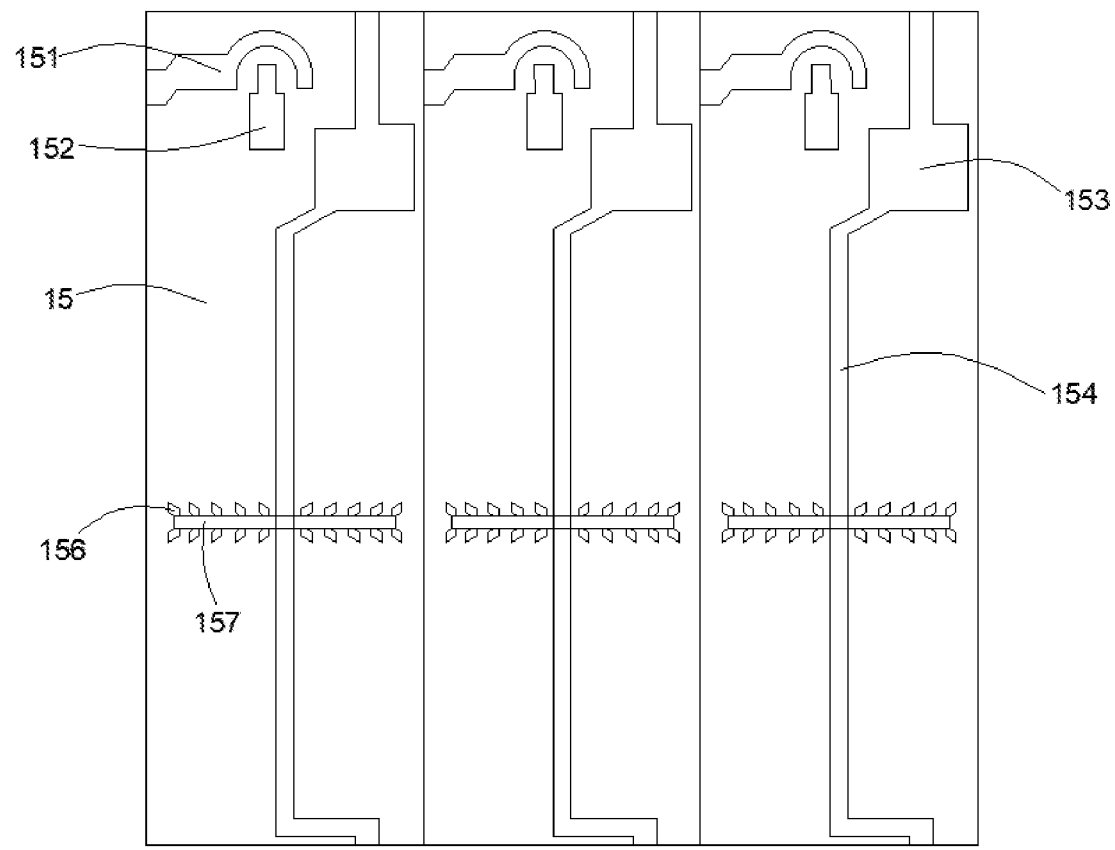
FIG. 16 is a top view of the second electrode layer in FIG. 13.

Referring to FIGS. 13 to 16, FIG. 13 is a schematic diagram of a fifth structure of the array substrate 100 provided by the present application, FIG. 14 is a cross-sectional view taken along line B-B in FIG. 13, and FIG. 15 is a top view of the second electrode layer in FIG. 13. The difference between the array substrate 100 provided in this embodiment and the array substrate 100 provided in FIG. 5 is that the first electrode layer 12 further includes a fifth common electrode 126 and a fifth connection electrode 127, the second electrode layer 15 further includes a sixth common electrode 156 and a sixth connection electrode 157, the fifth common electrode 126 and the sixth common electrode 156 are provided in the second trunk electrode area 105, and the orthographic projection of the fifth common electrode 126 on the substrate 11 overlaps with the orthographic projection of the sixth common electrode 156 on the substrate 11.

Since the existence of the semiconductor layer 14 will affect the value of the storage capacitance, the variable refresh rate of the display panel is thus ineffective. Therefore, in the present application, a fifth common electrode 126 is provided in the second trunk electrode area 105 through the first electrode layer 12, and a sixth common electrode 156 is provided in the second trunk electrode area 105 through the second electrode layer 15, so that the orthographic projection of the fifth common electrode 126 on the substrate 11 overlaps with the orthographic projection of the sixth common electrode 156 on the substrate 11, thus forming a storage capacitor between the fifth common electrode 126 and the fifth common electrode 126, thereby increasing the capacity of the storage capacitor and improving the effect of the variable refresh rate of the display panel.

Figure 17:
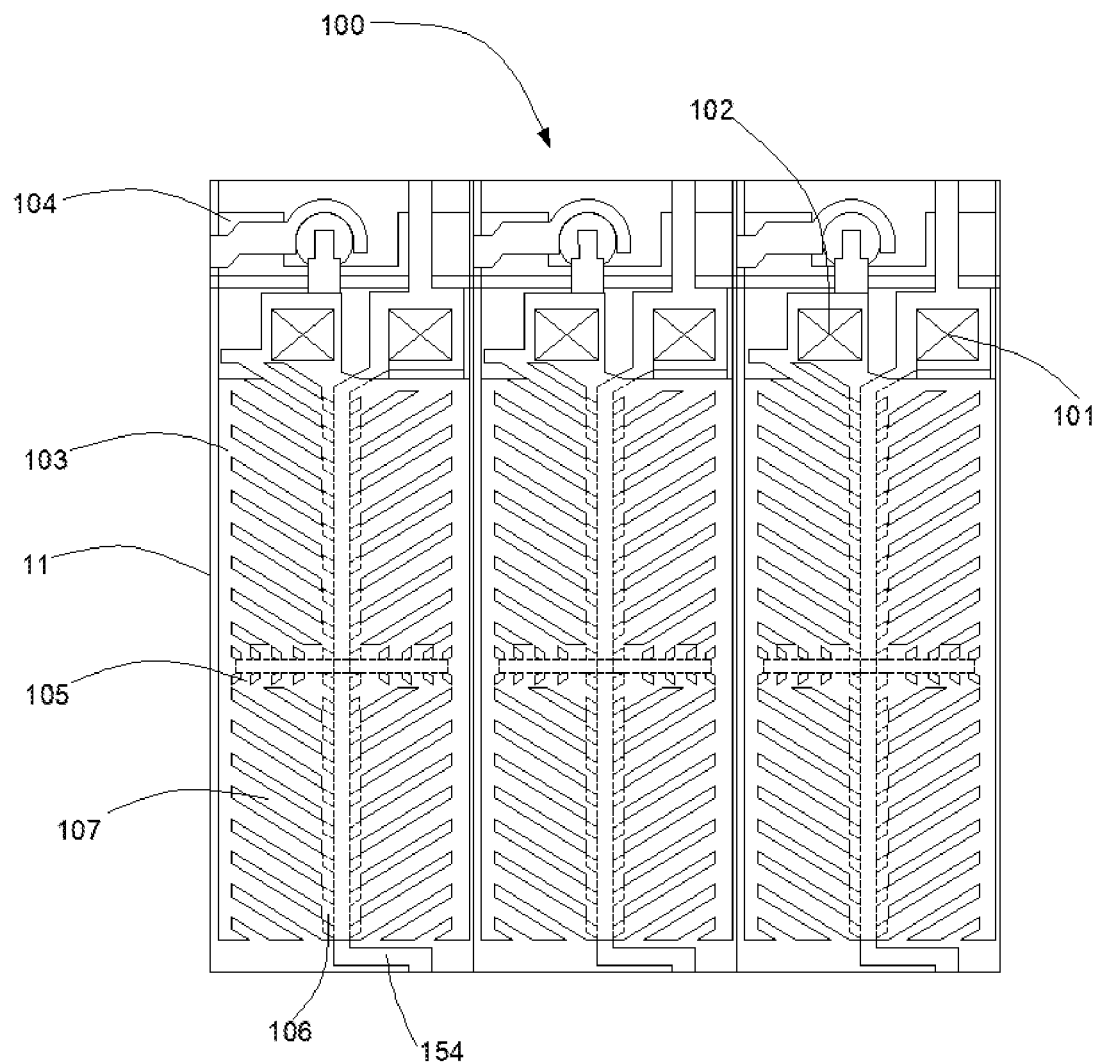
FIG. 17 is a schematic diagram of a sixth structure of the array substrate provided by the present application.
Figure 18:
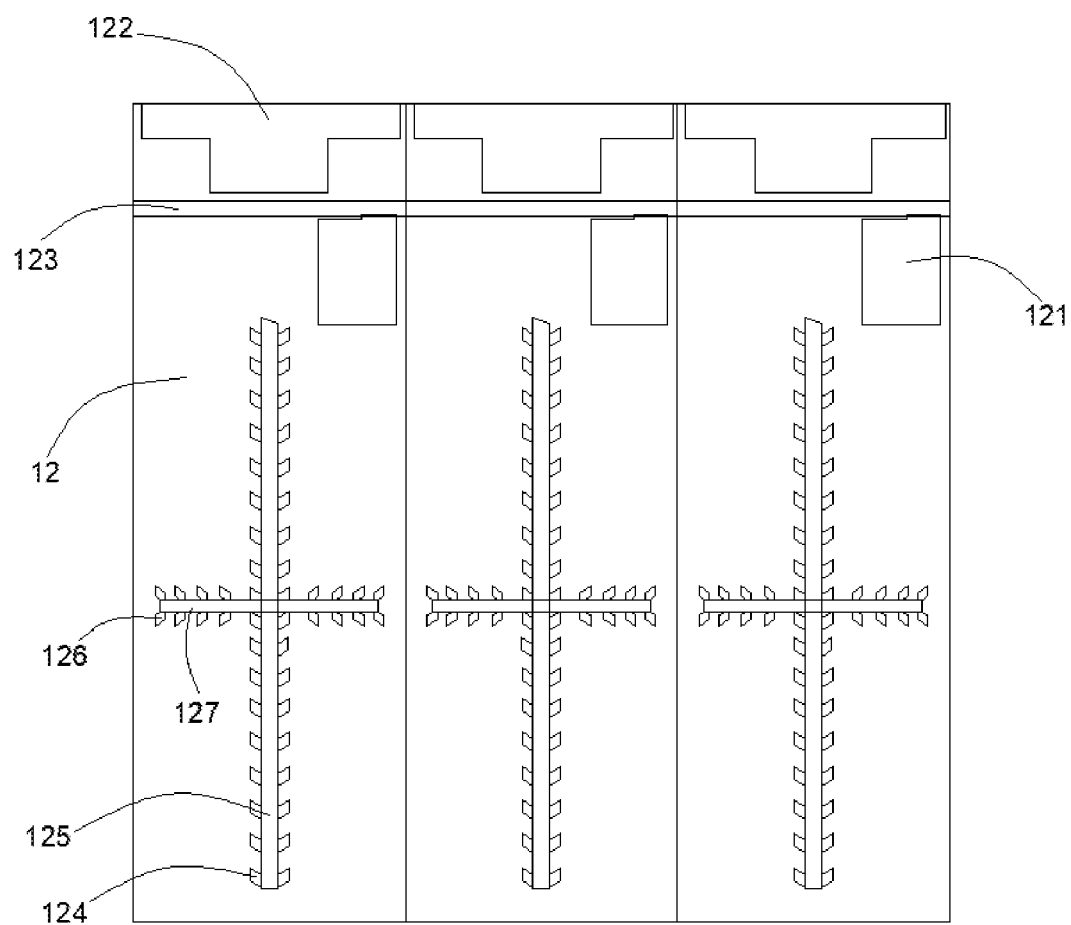
FIG. 18 is a top view of the first electrode layer in FIG. 17.
Figure 19:
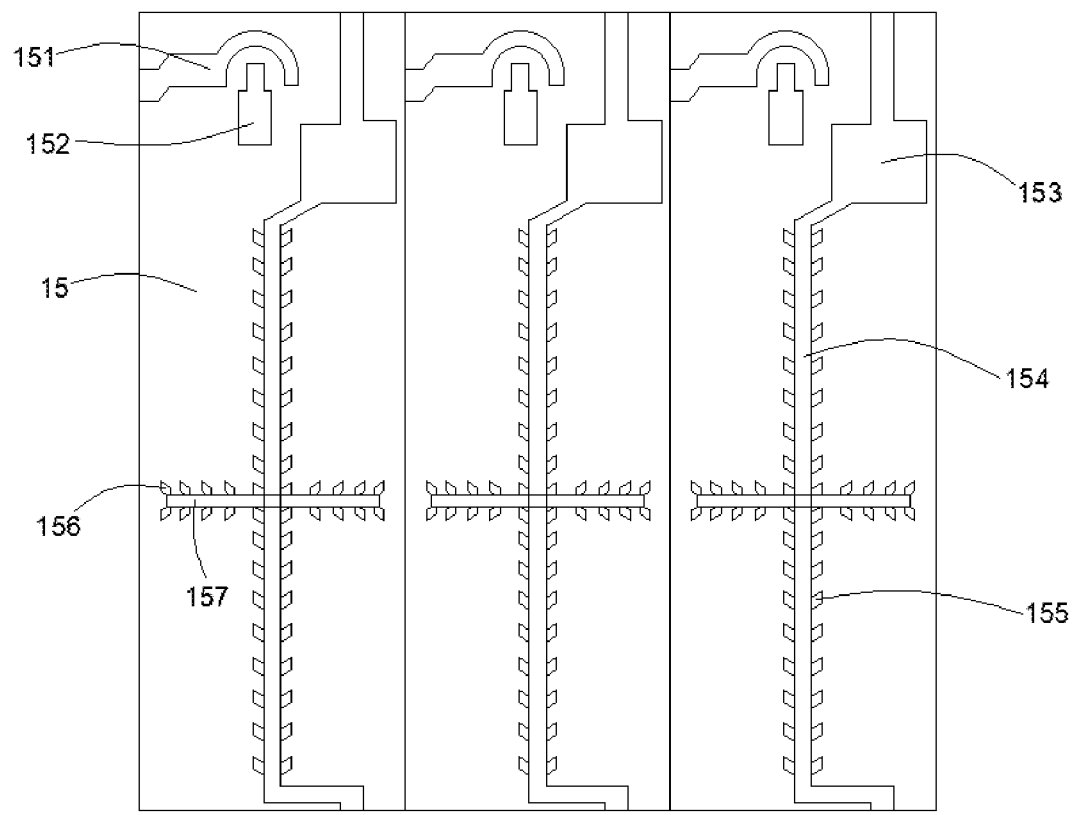
FIG. 19 is a top view of the second electrode layer in FIG. 17.

Referring to FIGS. 17 to 19, FIG. 17 is a schematic diagram of a sixth structure of the array substrate 100 provided by the present application, FIG. 18 is a top view of the first electrode layer in FIG. 17, and FIG. 19 is a top view of the second electrode layer in FIG. 17. The difference between the array substrate 100 provided in this embodiment and the array substrate 100 provided in FIG. 9 is that the first electrode layer 12 further includes a fifth common electrode 126 and a fifth connection electrode 127, the second electrode layer 15 further includes a sixth common electrode 156 and the sixth connection electrode 157, the fifth common electrode 126 and the sixth common electrode 156 are provided in the second trunk electrode area 105, the fifth common electrode 126 is connected to the third common electrode, the sixth common electrode 156 is connected to the fourth common electrode, and the orthographic projection of the fifth common electrode 126 on the substrate 11 overlaps with the orthographic projection of the sixth common electrode 156 on the substrate 11.

Since the existence of the semiconductor layer 14 will affect the value of the storage capacitor, the variable refresh rate of the display panel is ineffective. Therefore, in the present application, the fifth common electrode 126 is provided in the second trunk electrode area 105 through the first electrode layer 12, the sixth common electrode 156 is provided in the second trunk electrode area 105 through the second electrode layer 15, the fifth common electrode 126 is connected to the third common electrode 124, and the sixth common electrode 156 is connected to the fourth common electrode 155, so that the orthographic projection of the fifth common electrode 126 on the substrate 11 overlaps with the orthographic projection of the sixth common electrode 156 on the substrate 11, thereby further increasing the capacity of the storage capacitor and improving the effect of the variable refresh rate of the display panel.

Further, in some embodiments, the first electrode layer 12 further includes a fifth connection electrode 127, the second electrode layer 15 further includes a sixth connection electrode 157, a number of the fifth common electrode 126 and a number of the sixth connection electrode 157 are plural, the fifth connection electrode 127 connects the plurality of fifth common electrodes 126, and the sixth connection electrode 157 connects the plurality of sixth common electrodes 156. A plurality of fifth common electrodes 126 are arranged in an array, and a plurality of sixth common electrodes 156 are arranged in an array.

The array substrate, the method of manufacturing an array substrate, and the display panel provided by the embodiments of the present application are described in detail above. Specific examples are used to explain the principle and implementation of the present application. The descriptions of the above embodiments are only used to help understand the present application. Also, for those skilled in the art, according to the ideas of the present application, there will be changes in the specific implementation and application scope. In summary, the content of this specification should not be construed as limiting the present application.

What is claimed is:

1. An array substrate, comprising:
a substrate;
a first electrode layer disposed on the substrate, and the first electrode layer comprising a first common electrode;
a first insulating layer disposed on the first electrode layer;
a semiconductor layer disposed on the first insulating layer;
a second electrode layer disposed on the semiconductor layer and covering the first insulating layer, wherein the second electrode layer comprises a drain electrode, a source electrode, and a second common electrode, and the drain electrode and the source electrode are respectively connected to the semiconductor layer;
a first passivation layer disposed on the second electrode layer; and
a third electrode layer disposed on the first passivation layer, and the third electrode layer comprising a pixel electrode;
wherein an orthographic projection of the first common electrode on the substrate at least partially overlaps with an orthographic projection of the pixel electrode on the substrate, and the second common electrode is connected to the first common electrode through an opening in the first insulating layer; and
wherein the third electrode layer further comprises a first connection electrode, and the first connection electrode is connected to the second common electrode and the first common electrode through an opening penetrating the first insulating layer and the first passivation layer.

2. The array substrate according to claim 1, wherein the orthographic projection of the first common electrode on the substrate at least partially overlaps with an orthographic projection of the second common electrode on the substrate.

3. The array substrate according to claim 1, wherein the orthographic projection of the first common electrode on the substrate, the orthographic projection of the pixel electrode on the substrate, and an orthographic projection of the second common electrode on the substrate at least partially overlap.

4. The array substrate according to claim 1, wherein the second electrode layer further comprises a second connection electrode, a plurality of first common electrodes are arranged in an array, a plurality of second common electrodes are arranged in an array, and the second connection electrode is connected to the second common electrodes in a same row.

5. The array substrate according to claim 4, wherein the first electrode layer further comprises a third connection electrode, and the third connection electrode is connected to the first common electrodes in a same column.

6. The array substrate according to claim 4, wherein the substrate comprises a transparent area and an opaque area, the transparent area comprises a first trunk electrode area, a second trunk electrode area, and a branch electrode area, and the second connection electrode is disposed in the opaque area and the first trunk electrode area.

7. The array substrate according to claim 6, wherein the first electrode layer further comprises a third common electrode, the second electrode layer further comprises a fourth common electrode, the third common electrode and the fourth common electrodes are disposed in the first trunk electrode area, and an orthographic projection of the third common electrode on the substrate overlaps with an orthographic projection of the fourth common electrode on the substrate.

8. The array substrate according to claim 6, wherein the first electrode layer further comprises a fifth common electrode and a fifth connection electrode, the second electrode layer further comprises a sixth common electrode and a sixth connection electrode, and the fifth common electrode and the sixth common electrode are disposed in the second trunk electrode area; and
- an orthographic projection of the fifth common electrode on the substrate overlaps with an orthographic projection of the sixth common electrode on the substrate.

9. The array substrate according to claim 6, wherein the first electrode layer further comprises a fifth common electrode and a fifth connection electrode, the second electrode layer further comprises a sixth common electrode and a sixth connection electrode, and the fifth common electrode and the sixth common electrode are disposed in the second trunk electrode area; and
- wherein the fifth common electrode is connected to the third common electrode, the sixth common electrode is connected to the fourth common electrode, and an orthographic projection of the fifth common electrode on the substrate overlaps with an orthographic projection of the sixth common electrode on the substrate.

10. A method of manufacturing an array substrate, comprising:
- providing a substrate, forming a first electrode layer on the substrate, the first electrode layer comprising a first common electrode;
- forming a first insulating layer on the first electrode layer;
- forming a semiconductor layer on the first insulating layer;
- forming a second electrode layer on the semiconductor layer, wherein the second electrode layer covers the first insulating layer, the second electrode layer comprises a drain electrode, a source electrode, and a second common electrode, and the drain electrode and the source electrode are respectively connected to the semiconductor layer;
- forming a first passivation layer on the second electrode layer; and
- forming a third electrode layer on the first passivation layer, the third electrode layer comprising a pixel electrode and a first connection electrode;
- wherein an orthographic projection of the first common electrode on the substrate at least partially overlaps with an orthographic projection of the pixel electrode on the substrate, and the first connection electrode is connected to the second common electrode and the first common electrode through an opening penetrating the first insulating layer and the first passivation layer.

11. A display panel, comprising an array substrate, a color filter substrate disposed opposite to the array substrate, and a liquid crystal layer disposed between the array substrate and the color filter substrate;
- wherein the array substrate comprises:
- a substrate;
- a first electrode layer disposed on the substrate, and the first electrode layer comprising a first common electrode;
- a first insulating layer disposed on the first electrode layer;
- a semiconductor layer disposed on the first insulating layer;
- a second electrode layer disposed on the semiconductor layer and covering the first insulating layer, wherein the second electrode layer comprises a drain electrode, a source electrode, and a second common electrode, and the drain electrode and the source electrode are respectively connected to the semiconductor layer;
- a first passivation layer disposed on the second electrode layer; and
- a third electrode layer disposed on the first passivation layer, and the third electrode layer comprising a pixel electrode;
- wherein an orthographic projection of the first common electrode on the substrate at least partially overlaps with an orthographic projection of the pixel electrode on the substrate, and the second common electrode is connected to the first common electrode through an opening in the first insulating layer; and
- wherein the third electrode layer further comprises a first connection electrode, and the first connection electrode is connected to the second common electrode and the first common electrode through an opening penetrating the first insulating layer and the first passivation layer.

12. The display panel according to claim 11, wherein the orthographic projection of the first common electrode on the substrate at least partially overlaps with an orthographic projection of the second common electrode on the substrate.

13. The display panel according to claim 11, wherein the orthographic projection of the first common electrode on the substrate, the orthographic projection of the pixel electrode on the substrate, and an orthographic projection of the second common electrode on the substrate at least partially overlap.

14. The display panel according to claim 11, wherein the second electrode layer further comprises a second connection electrode, a plurality of first common electrodes are arranged in an array, a plurality of second common electrodes are arranged in an array, and the second connection electrode is connected to the second common electrodes in a same row.

15. The display panel according to claim 14, wherein the first electrode layer further comprises a third connection electrode, and the third connection electrode is connected to the first common electrodes in a same column.

16. The display panel according to claim 14, wherein the substrate comprises a transparent area and an opaque area, the transparent area comprises a first trunk electrode area, a second trunk electrode area, and a branch electrode area, and the second connection electrode is disposed in the opaque area and on the first trunk electrode area.

17. The display panel according to claim 16, wherein the first electrode layer further comprises a third common electrode, the second electrode layer further comprises a fourth common electrode, the third common electrode and the fourth common electrodes are disposed in the first trunk electrode area, and an orthographic projection of the third common electrode on the substrate overlaps with an orthographic projection of the fourth common electrode on the substrate.

18. The display panel according to claim 16, wherein the first electrode layer further comprises a fifth common electrode and a fifth connection electrode, the second electrode layer further comprises a sixth common electrode and a sixth connection electrode, and the fifth common electrode and the sixth common electrode are disposed in the second trunk electrode area; and
- wherein an orthographic projection of the fifth common electrode on the substrate overlaps with an orthographic projection of the sixth common electrode on the substrate.

* * * * *